United States Patent
Rogers

Patent Number: 5,090,624
Date of Patent: Feb. 25, 1992

[54] HAND HELD SHOWER ADAPTED TO PROVIDE PULSATING OR STEADY FLOW

[75] Inventor: Daniel G. Rogers, Homer, Mich.

[73] Assignee: Alsons Corporation, Hillsdale, Mich.

[21] Appl. No.: 616,119

[22] Filed: Nov. 20, 1990

[51] Int. Cl.$^5$ ............................. B05B 1/08; B05B 3/06
[52] U.S. Cl. ..................................... 239/381; 239/525; 239/447
[58] Field of Search ...................... 239/381, 553–553.5, 239/558, 559, 552, 525, 446–449, 443, 444

[56] References Cited

U.S. PATENT DOCUMENTS

| | | | |
|---|---|---|---|
| 2,950,063 | 8/1960 | Ripley, Jr. | 239/449 |
| 3,967,783 | 7/1976 | Halsted et al. | 239/381 |
| 4,203,550 | 5/1980 | On | 239/447 |
| 4,254,914 | 3/1981 | Shames et al. | 239/447 |
| 4,346,844 | 8/1982 | Harmony | 239/381 |
| 4,398,669 | 8/1983 | Fienhold | 239/447 |
| 4,588,130 | 5/1986 | Trenory et al. | 239/381 |
| 4,674,687 | 6/1987 | Smith et al. | 239/525 |
| 4,754,928 | 7/1988 | Rogers et al. | 239/449 |

FOREIGN PATENT DOCUMENTS 3706320  3/1988  Fed. Rep. of Germany ...... 239/381

Primary Examiner—Andres Kashnikow
Assistant Examiner—Lesley D. Morris
Attorney, Agent, or Firm—Myron B. Kapustij; Malcolm L. Sutherland; Edgar A. Zarins

[57] ABSTRACT

A hand held shower including a spray head operable to selectively discharge a continuous spray or a cyclically interrupted pulsating spray. The spray head contains two separate groups of discharge orifices, one group operable to discharge a continuous spray, and the second group operable to discharge a cyclically interrupted pulsating spray. The spray head comprises a housing forming a chamber; a water inlet plate having two sets of supply orifices, a radially outer steady spray supply set and a radially inner pulsating spray supply set, closing the forward end of the chamber and fixedly mounted in the housing; a face plate having a wall confronting the water inlet plate and having two sets of supply perforations therein, a radially outer steady spray supply set and a radially inner pulsating spray supply set; the face plate being mounted for limited arcuate movement with respect to the water inlet plate so that either the radially outer steady spray supply perforations can be aligned with the radially outer steady spray supply orifices in the water inlet plate, or so that the radially inner pulsating spray supply perforation can be aligned with the radially inner pulsating spray supply orifice in the water inlet plate. The radially outer perforations of the face plate are in communication with an annular chamber containing the continuous spray discharge orifices. The radially inner perforations of the face plate are in communication with a cylindrical chamber disposed radially inwardly of the annular chamber. A spinner having radially extending vanes and a partially closed front end is rotatably mounted in said cylindrical chamber. Flow through the radially inner perforations impinges upon the vanes to drive the spinner in rotation. Rotation of the spinner, due to its partially closed end, provides a cyclical flow to a group of discharge orifices in a spinner cover which is fixedly mounted over the open, front end of the cylindrical chamber. This cyclical flow through these discharge orifices provides a pulsating spray.

9 Claims, 4 Drawing Sheets

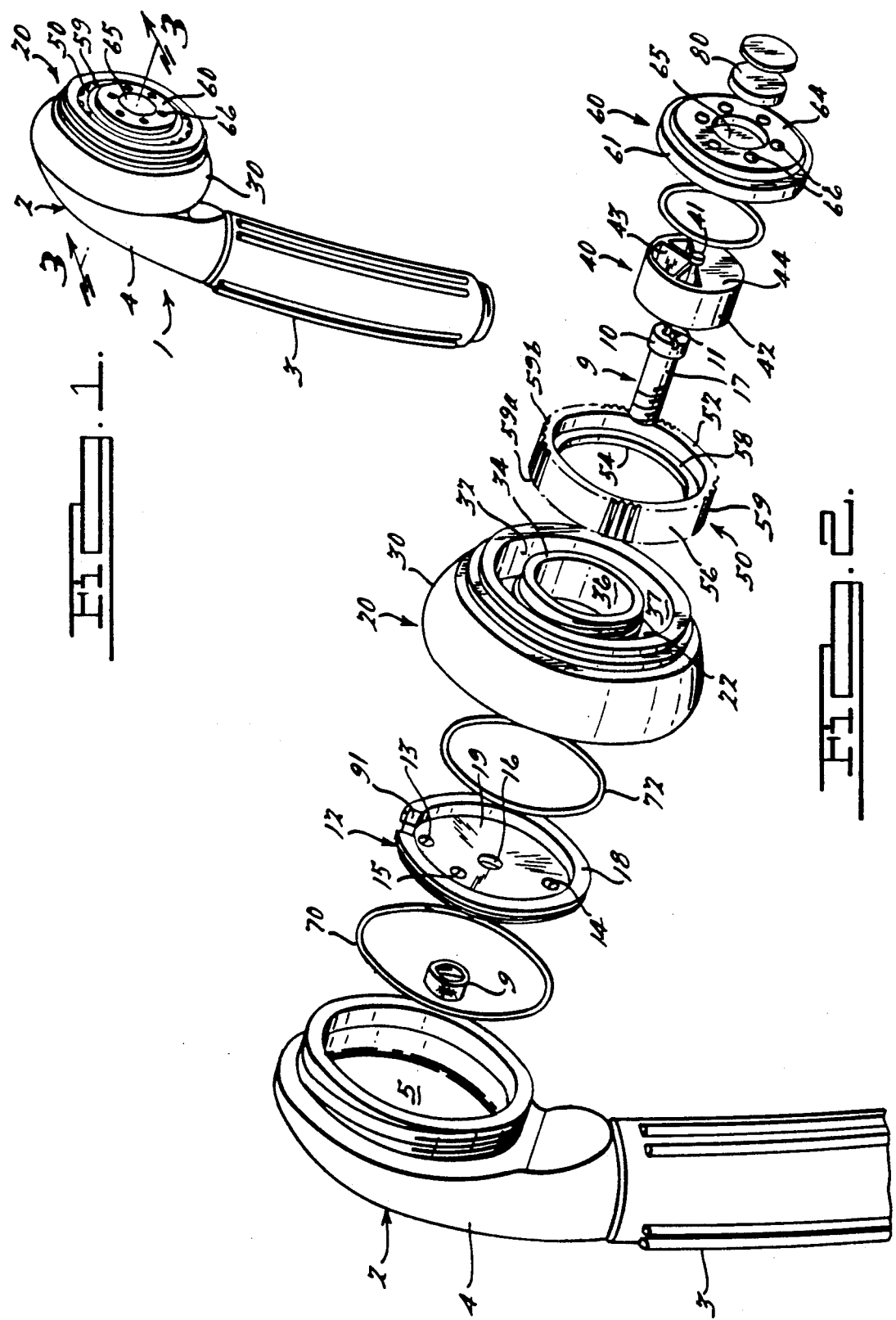

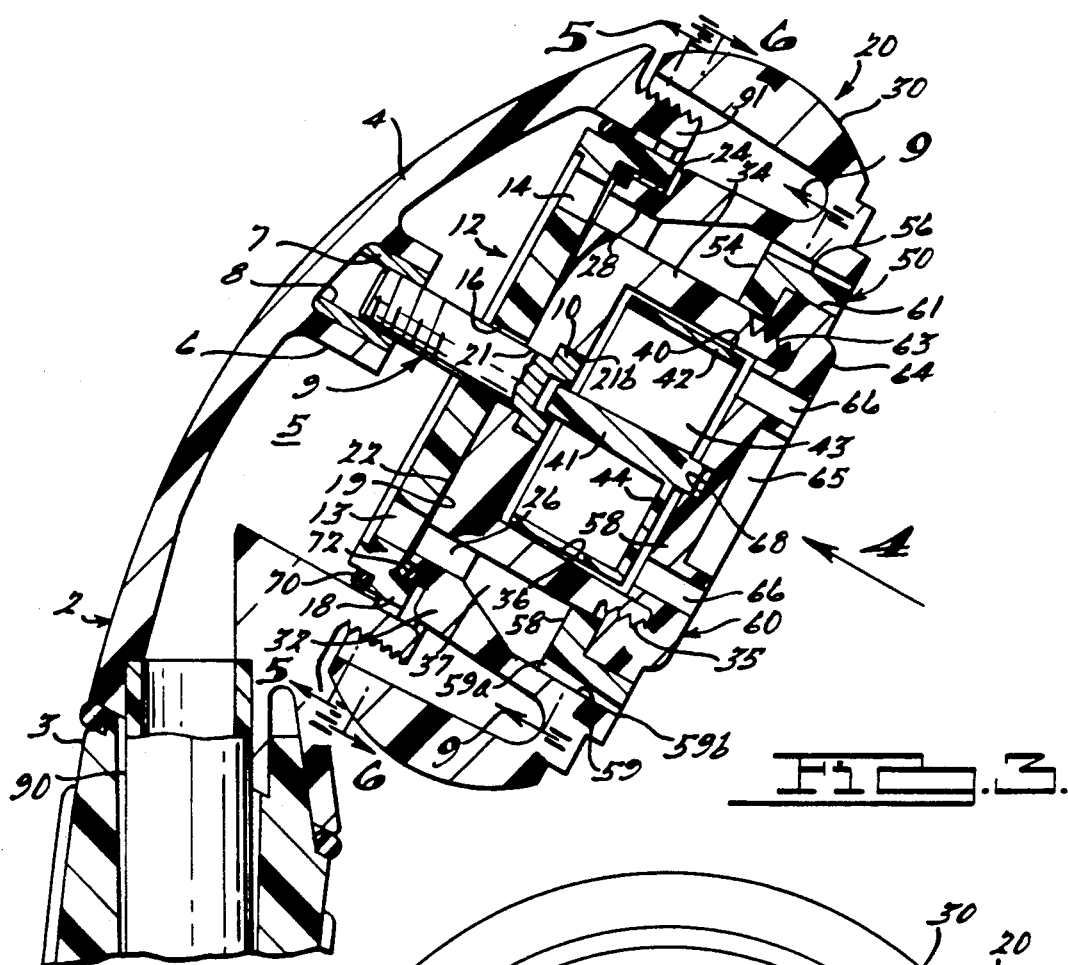
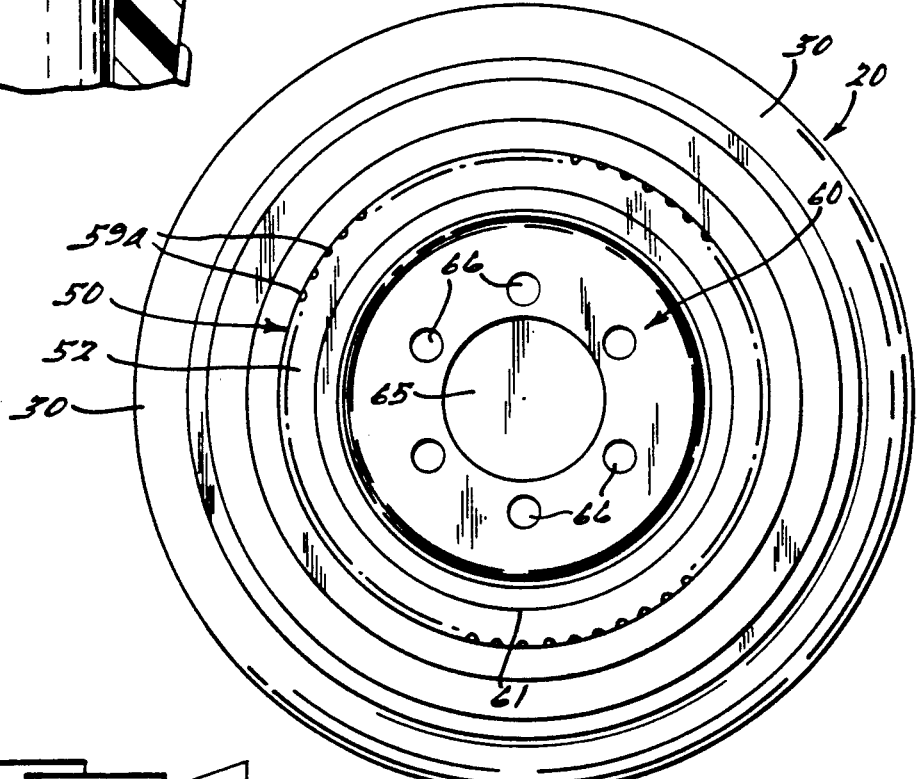

HAND HELD SHOWER ADAPTED TO PROVIDE PULSATING OR STEADY FLOW

FIELD OF THE INVENTION

This invention relates to hand held showers, more particularly to hand held showers capable of selectively providing either a steady spray or a pulsating spray.

BACKGROUND OF THE INVENTION

Various types of showers which produce a pulsating spray are known; for example, those described in U.S. Pat. Nos. 1,446,887; 1,609,407; 2,878,066; 3,473,736; 3,568,716; 3,713,587 and 3,762,648. Most of these merely produce only a pulsating spray. Some, however, may be adjusted to provide a steady or pulsating spray. For such showers, the spray head is complicated and the adjustment to select the desired spray is sometimes difficult under conditions of use.

SUMMARY OF THE INVENTION

The present invention is directed to a hand held shower comprising a spray head capable of providing a pulsating spray or a steady spray. The spray head includes a face plate having an easily engageable peripheral rim which is readily turned with respect to the spray head housing to produce a coarse pulsating spray or a steady fine spray.

The shower comprises a spray head including a housing having a chamber open at its front end. A generally flat, circular water inlet plate is fixedly mounted in the housing at the front end of the chamber, closing the front end of the chamber. The water inlet plate has two sets of fluid supply openings therein, a radially outer set to provide flow to the steady spray discharge orifices, and a radially inner set to provide flow to the pulsating spray discharge orifices. A face plate having a flat, circular shaped wall with two sets of supply orifices therein, a radially outer steady spray supply set and a radially inner pulsating spray supply set, and also having a radially outer annular chamber and a radially inner cylindrical chamber, is rotatably secured to the housing. The radially outer steady spray supply orifices are in communication with the annular chamber, and the radially inner pulsating spray supply orifices are in communication with the cylindrical chamber. The back or downstream face of the face plate wall confronts the front or upstream face of the water inlet plate. Rotation of the face plate relative to the water inlet plate selectively aligns the radially outer steady spray supply orifices of the wall with the radially outer steady spray supply openings of the water inlet plate, or the radially inner pulsating spray supply orifice of the wall with the radially inner pulsating spray supply opening in the water inlet plate.

Disposed in the annular chamber is a spray ring having a plurality of circumferentially spaced apart axially extending grooves. These grooves, along with the radially outer side wall of the annular chamber form the steady spray orifices.

Rotatably disposed in the cylindrical chamber is a spinner comprising a hollow tubular member having a cylindrical wall and a central axially extending journal. A plurality of vanes extend radially from the journal to the cylindrical wall of the spinner. A tubular member is partially closed at its front or downstream end by a semicircular plate. The circular spinner cover closes the front or downstream open end of the cylindrical chamber. A plurality of discharge orifices extend through the spinner cover and comprise the pulsating spray orifices.

Water entering the cylindrical chamber through the radially inner pulsating spray supply orifice in the wall of the face plate impinges upon the vanes of the spinner, causing rotation of the spinner. The flow of water through the discharge orifices in the spinner cover is intermittent or pulsating due to the sequential passage of the partially closed front end of the spinner across the discharge orifices in the spinner cover.

BRIEF DESCRIPTION OF THE DRAWINGS

FIG. 1 is a reduced perspective view of the shower;

FIG. 2 is an exploded perspective view of the shower;

FIG. 3 is a sectional view taken through 3—3 of FIG. 1;

FIG. 4 is a front view taken along line 4 of FIG. 3;

DESCRIPTION OF THE PREFERRED EMBODIMENT

Figure 5:
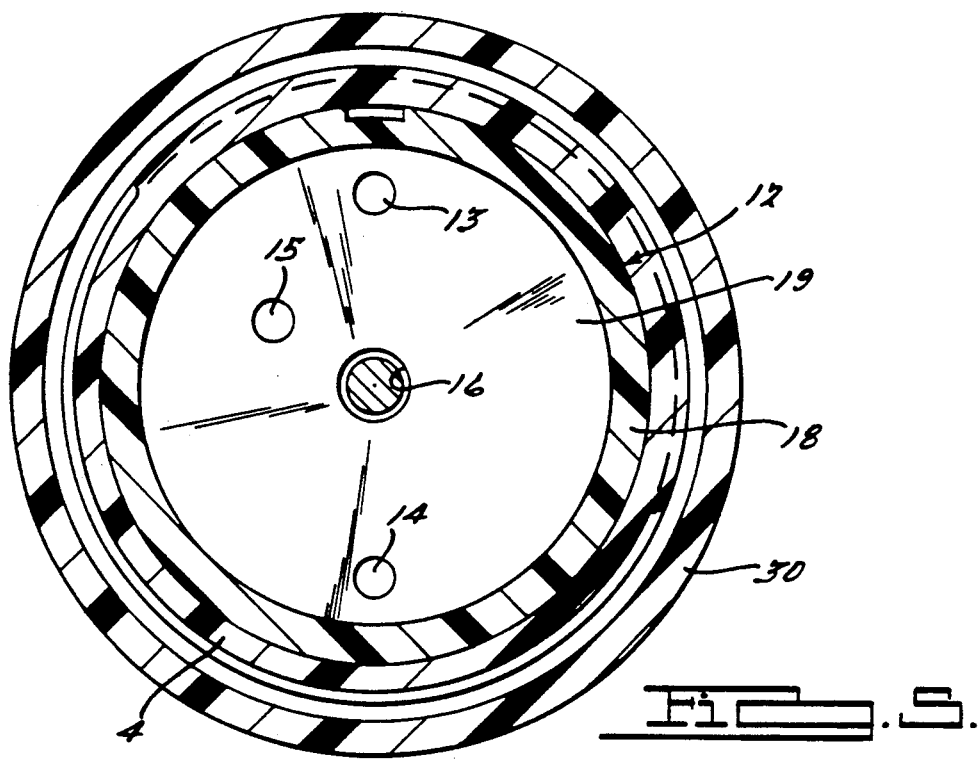
FIG. 5 is a sectional view taken along 5—5 of FIG. 3.

The hand held shower of the invention includes a spray head 2 which in the construction shown in FIG. 1 is provided with a tubular handle 3. The tubular handle 3 is hollow and, as shown in FIG. 3, has a hollow tubular member 90 disposed therein. The spray head 2 includes a housing 4, preferably comprised of a plastic material. The housing 4 forms a chamber 5 having a central mandrel 6. The tubular member 90 is in fluid communication with chamber 5. A metal, e.g. copper, brass, etc., insert 7 is fixedly disposed in mandrel 6. The insert 7 is internally threaded at 8 and threadedly receives and secures a mounting bolt 9. Mounting bolt 9 is preferably made of a metal such as, for example, copper or brass. The insert 7 is secured inside the mandrel 6 as, for example, by an adhesive, sonic welding, heat sealing, and the like. Mounting bolt 9 has a shank 17 and a head 10, with the lower portion of the shank 17 being threaded. A cup shaped bearing aperture 11 is disposed in the head 10 of the mounting bolt. Bearing aperture 11 rotatably receives journal 41 of spinner 40 as described below.

The forward or upstream end of chamber 5 is closed by water inlet plate 12 which is heat sealed, adhesively sealed, or otherwise secured to the housing 4. An O-ring 70 is inserted between the side of water inlet plate 12 and housing 4 to form a seal therebetween. Water inlet plate 12 is generally disk shaped and has a flat outer surface 19. Rotatably mounted within water inlet plate 12 is wall 22 of face plate 20. The wall 22 of face plate 20 is circular in shape and confronts water inlet plate 12, and is sealed with respect to plate 12 by O-ring 72. Wall 22 is sized to fit within peripheral wall 18 of water inlet plate 12.

Water inlet plate 12 has a radially outward set of steady spray supply openings 13 and 14, and a radially inner pulsating spray supply opening 15 extending axially therethrough. The openings 13, 14 and 15 are circumferentially spaced, with openings 13 and 14, in the construction shown in FIG. 5, being circumferentially spaced apart by 180°.

Plate 12 also has a central opening 16 extending axially therethrough. Central opening 16 receives the shank 17 of mounting bolt 9, which shank extends through central opening 16.

Plate 12 further has a circumferentially extending peripheral wall 18 projecting axially forward or upstream of plate 12. As illustrated in FIG. 3, wall 22 of face plate 20 confronts the flat outer surface 19 of water inlet plate 12 which is circumscribed by peripheral wall 18. As also shown in FIG. 3 the peripheral wall 18 is sized to have an inner diameter greater than the outer diameter of annular recess 24 of face plate 20.

Figure 6:
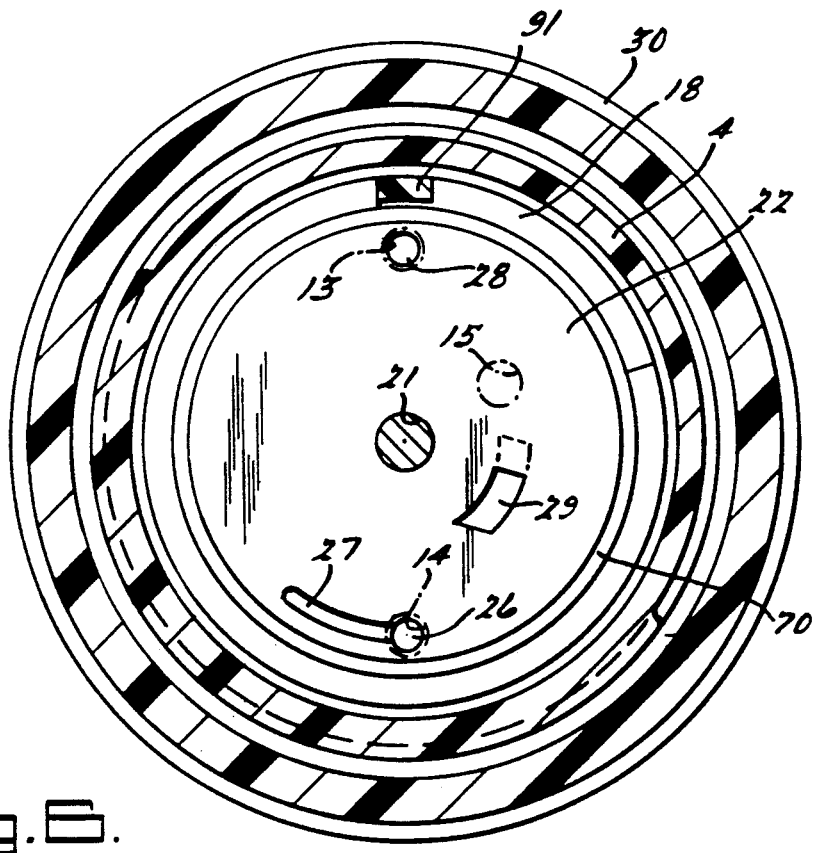
FIG. 6 is a sectional view taken along 6—6 of FIG. 3 showing the shower head set in the steady spray mode.
Figure 7:
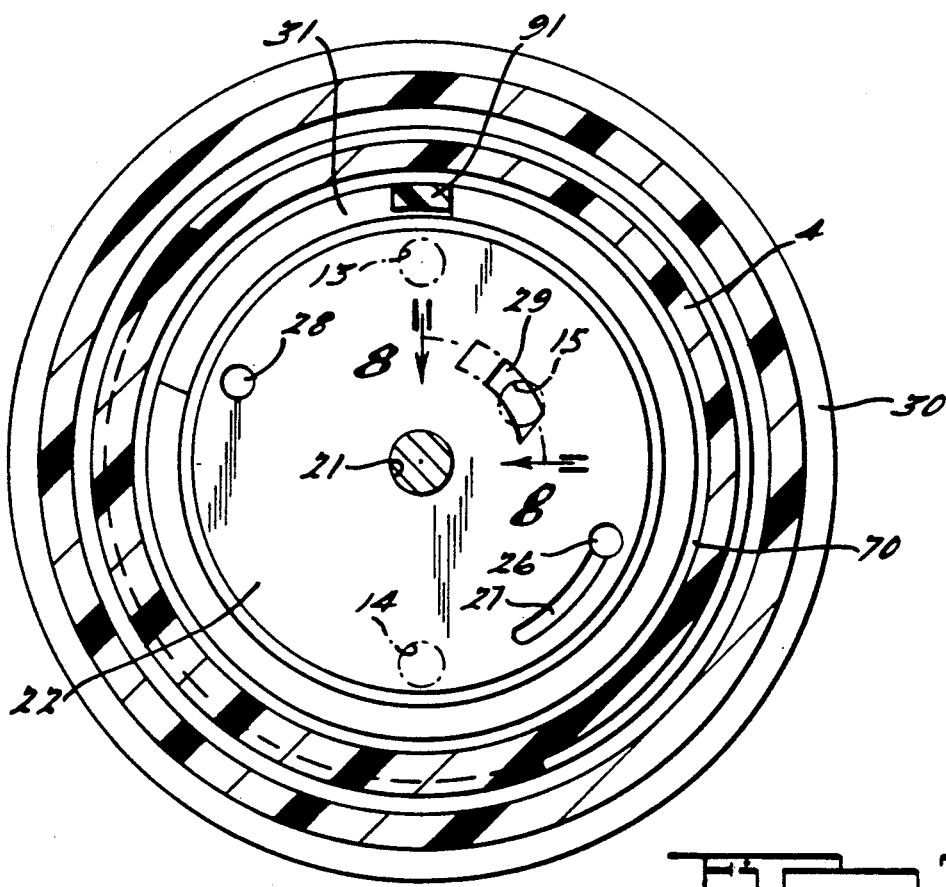
FIG. 7 is similar to FIG. 6 except that it illustrates the shower head set in the pulsating spray mode.

Wall 22 is provided with a radially outer set of steady spray supply perforations 26 and 28 to align with radially outer steady spray supply opening 13 and 14, and with a radially inner pulsating spray supply perforation 29 to align with radially inner pulsating spray supply opening 15. As illustrated in FIGS. 6 and 7, a shallow arcuate leak groove 27 is cut into the surface of wall 22. The leak groove may be in communication with any one of the radially outer perforations 26 or 28. In the structure illustrated in FIGS. 6 and 7, it is in communication with perforations 26.

Figure 8:
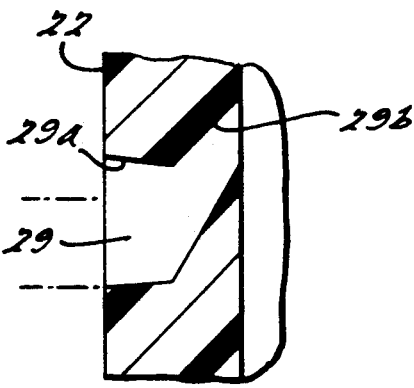
FIG. 8 is a sectional view taken along 8—8 of FIG. 7 showing the angled radially inner pulsating spray supply orifice.

As illustrated in FIG. 8 radially inner perforation 29 does not extend in a straight line through wall 22; but has its discharge opening 29b angled with respect to its inlet opening 29a. Preferably, the discharge opening is angled at about 45° with respect to the inlet opening.

Wall 22 also is provided with a central aperture 21 adapted to receive mounting bolt 9. As illustrated in FIG. 3, the central aperture 21 has a downstream portion 21a and an upstream portion 21b. Downstream portion 21a has a smaller diameter than upstream portion 21b. The downstream portion 21a also has a smaller diameter than the head 10 of mounting bolt 9. Head 10 of mounting bolt 9 is thus seated in the upstream portion 21b of aperture 21. The head 10 of bolt 9 is flush with the upstream surface of wall 22.

The shank of mounting bolt 9 extends through aperture 21 and clamps the wall 22 against the water inlet plate 12 to provide a predetermined degree of resistance of rotation of the face plate 20 with respect to the water inlet plate 12.

In order to limit rotation of the face plate 20 with respect to housing 4 and to more easily change from a pulsating spray to a steady spray, the peripheral wall 18 of the water inlet plate 12 is provided with a projection or tab 91, and the corresponding region of the face disk 20 is provided with an arcuate groove 31, as shown in FIGS. 2, 6 and 7.

The face disk 20 includes a marginal rim 30 which projects radially beyond the water inlet plate 12 and forward of the housing 4. The marginal rim 30 also extends radially beyond and forwardly of wall 22.

A radially outer cylindrical wall 32 extends forwardly or upstream of wall 22. The downstream end or back of the outer cylindrical wall 32 defines the outer periphery or circumference of circular wall 22. At its upstream or forward end, outer cylindrical wall 32 joins the marginal rim 30. An inner cylindrical wall 34 extends forwardly or upstream of wall 22. Inner cylindrical wall 34 is concentric with outer cylindrical wall 32, has an outer diameter which is smaller than the inner diameter of the outer cylindrical wall 32, and is disposed radially inwardly of the outer cylindrical wall.

The front end of the inner cylindrical wall 34 is externally threaded at 35.

The circular wall 22, outer cylindrical wall 32, and inner cylindrical wall 34 define an annular chamber 37 open at its front or upstream end. The circular wall 22 and inner cylindrical wall 34 define a cylindrical chamber 36 which is open at its front or upstream end.

As shown in FIG. 3 the radially outer set of perforations 26 and 28 in wall 22 are in communication with annular chamber 37. Radially inner perforation 29 in wall 22 is in communication with cylindrical chamber 36. As also shown in FIG. 3 central aperture 21 is also in communication with cylindrical chamber 36.

Figure 9:
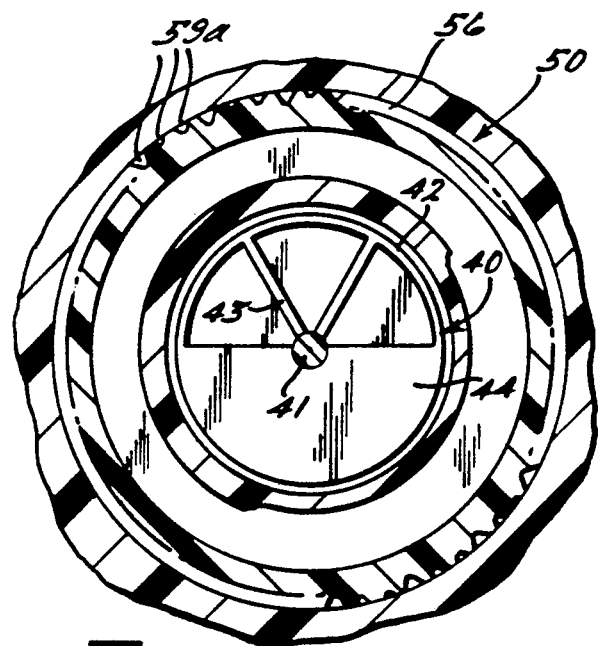
FIG. 9 is a sectional view taken along 9—9 of FIG. 3.

Disposed in annular chamber 37 is spray ring 50. Spray ring 50 is preferably comprised of an elastomeric material such as rubber. Spray ring 50 has a front or upstream end 52 and a back or downstream end 54. The spray ring 50 is generally annular in shape with axially extending side wall 56, and a radially inwardly extending collar 58 at its back end. Collar 58 is sized to fit over inner cylindrical wall 34. The radially outer surface of side wall 56 is formed with a plurality of circumferentially spaced apart axially extending grooves. As shown in FIG. 3 the grooves are deeper at their back or downstream ends 59a, and shallower at their front or upstream ends 59b. The grooves 59 thus ends 59b. In a preferred embodiment, as shown in FIGS. 4 and 5, the depth of the front ends 59b of grooves 59 is the same. However, as shown in FIG. 9, the depth of back ends 59a of the grooves 59 varies among the grooves. In the construction illustrated in FIG. 9 the back ends 59a of the grooves have three different depths, thereby forming three sets of grooves, each set having a different depth of its back end. Thus, the grooves are divided into three sets of grooves, each set having a different taper angle. In a more preferred embodiment, the taper angle of the set of grooves having the greatest depth of their back ends 59a is about 5°, the taper angle of the set of grooves having the shallowest depth of their back ends is about 1°, and the taper angle of the set of grooves having an intermediate depth of their back ends is about 3°.

The grooves 59, when the spray ring 50 is disposed in the annular chamber 37, together with the radially outer cylindrical wall 32 define one group of spray discharge orifices. These discharge orifices produce a steady stream or spray of water. Due to their being three sets of grooves, each set having a different taper angle, the spray discharge orifices produce three different generally concentric conical spray patterns, each having a different diameter.

Spinner 40 is rotatably disposed within cylindrical chamber 36. The spinner 40 comprises a tubular structure having an axially extending cylindrical wall 42, a central journal 41, and a plurality of radially extending vanes 43 extending from the central journal 41 to the cylindrical wall 42. In the embodiment illustrated in FIGS. 2, 3 and 9, the front or upstream end of spinner 40 is partially closed by a semicircular plate 44.

The downstream or rear end of journal 41 is rotatably mounted within bearing aperture 11 of the mounting bolt head 10.

Spinner cover 60 has a generally round outer face disk 64 and cylindrical wall 61 extending axially and rearwardly of outer face disk 64. A plurality of circumferentially spaced apart discharge orifices 66 extend axially through outer face disk 64. The discharge orifices are in communication with chamber 36.

The inner side of wall 61 is threaded at 63, and threadedly engages the exterior threads 35 of inner cylindrical wall 34, thereby securing the spinner cover 60 to the face plate.

The outer face disk 64 covers the open front end of cylindrical chamber 36. The rear or downstream side of outer face disk 64 has a central bearing aperture 68 therein. Bearing aperture 68 rotatably receives the front or upstream end of journal 41.

The front or upstream side of outer face disk 64 has a generally cup shaped aperture 65 which is adapted to receive an adhesive pad 80. A suitable decorative cover or label may be mounted on the spinner cover by means of said adhesive pad 80.

In operation water enters the chamber 5 through hollow tubular member 4. When it is desired to have a pulsating spray face plate 20 is rotated or set as shown in FIG. 7 with the radially inner pulsating spray supply perforation 29 in wall 22 aligned with radially inner pulsating spray supply opening 15 in water inlet plate 12. Water then enters cylindrical chamber 36 through the aligned perforation 29 and opening 15. However, since the discharge opening 29b of radially inner perforation 29 is angled with respect to the inner or upstream surface of wall 22, the water entering cylindrical chamber 36 impinges upon the vanes 43 of spinner 40 at an angle, thus causing the spinner 40 to rotate about a central axis coincident with axle 41. Since spinner 41 has a semicircular plate 44 partially closing its front or upstream end, water can exit discharge orifices 66 in spinner cover 60 only when the open front ends of spinner 40 are aligned with the discharge orifices 66. When the discharge orifices 66 are covered by semicircular plate 44, discharge of water through discharge orifices 66 is cutoff. This causes an intermittent or pulsating discharge of water through discharge orifices 66.

When it is desired to have a steady spray face plate 20 is rotated or set as shown in FIG. 6 with the radially outer steady spray supply perforations 26 and 28 in wall 22 aligned with radially outer steady spray supply openings 13 and 14 in water inlet plate 12. Water then enters annular chamber 37 through the aligned perforations and openings. Water then exits the annular chamber via the spray discharge orifices defined by the grooves 59 and radially outer cylindrical wall 32 as a steady spray.

When face plate 20 is rotated so that neither radially inner perforation 29 is in register with radially inner opening 15, nor radially outer perforations 28 and 26 are in register with radially outer openings 13 and 14, radially outer opening 14 will be aligned with leak groove 27. Thus, water will enter the annular chamber 37 by flowing through radially outer opening 14 and into leak groove 27, and from leak groove 27 into radially outer perforation 26 which is in communication with annular chamber 37. From the annular chamber it will flow out through the steady spray orifices defined by radially outer cylindrical wall 32 and grooves 59. This slow but steady flow of water will indicate to the user of the shower that the water flow to the shower needs to be turned off.

Variations and modifications of the invention are contemplated without departing from its spirit as defined in the appended claims.

I claim:

1. A shower comprising a shower head comprised of:
    a housing forming a chamber defined in part by a water inlet plate having at least one radially outer steady spray supply opening, and a radially inner pulsating spray supply opening;
    a face plate having a wall sealingly confronting the water inlet plate, the wall having at least one radially outer steady spray supply orifice, and a radially inner pulsating spray supply orifice, the face plate being manually movable arcuately to connect the steady spray supply opening with the steady spray supply orifice, or to connect the pulsating spray supply opening with the pulsating spray supply orifice.
    said face plate including a radially outer annular chamber opening at its front or upstream end on the side of said wall opposite the side confronting said water inlet plate, and a radially inner cylindrical chamber open at its front or upstream end on the side of said wall opposite the side confronting said water inlet plate, said at least one radially outer steady spray supply orifice being in communication with said annular chamber and said radially inner pulsating spray supply orifice being in communication with said cylindrical chamber;
    a circular cover having a plurality of pulsating spray discharge orifices closing the cylindrical chamber at its front, open end;
    means disposed in said cylindrical chamber for producing a pulsating spray; and
    means disposed in said annular chamber for producing a steady spray.

2. The shower according to claim 1 wherein said means for producing a pulsating spray comprise a spinner rotatably mounted in said cylindrical chamber comprised of a tubular member having an open back or downstream end and a partially closed front or upstream end, a cylindrical wall, a central axially extending journal, and a plurality of vanes extending radially from said journal to said cylindrical wall.

3. The shower according to claim 2 wherein said pulsating spray supply orifice is angled, so that water enters the cylindrical chamber at an angle, thereby impinging upon said vanes and rotating said spinner.

4. The shower according to claim 1 wherein said means for producing a steady spray comprises a spray ring comprised of an annular wall having a back or downstream end, a front or upstream end, and a radially outer surface with a plurality of circumferentially spaced axially extending grooves therein.

5. The shower according to claim 4 wherein the grooves are tapered, being shallower at the front end and deeper at the back end, thereby producing a conical steady spray pattern.

6. The shower according to claim 5 wherein the grooves have the same depth at the front end.

7. The shower according to claim 6 wherein the depth at the back end of the grooves varies among the grooves, thereby producing a plurality of conical steady spray patterns.

8. The shower according to claim 4 wherein said spray ring is comprised of an elastomeric material.

9. The shower according to claim 8 wherein said elastomeric material comprises rubber.

* * * * *